Feb. 5, 1929.　　L. BLUMENTHAL　　1,701,293

DOUGH DRIPPING DEVICE

Filed Feb. 23, 1926　　2 Sheets-Sheet 1

INVENTOR
Louis Blumenthal
BY
Hauff Sbarland
ATTORNEYS

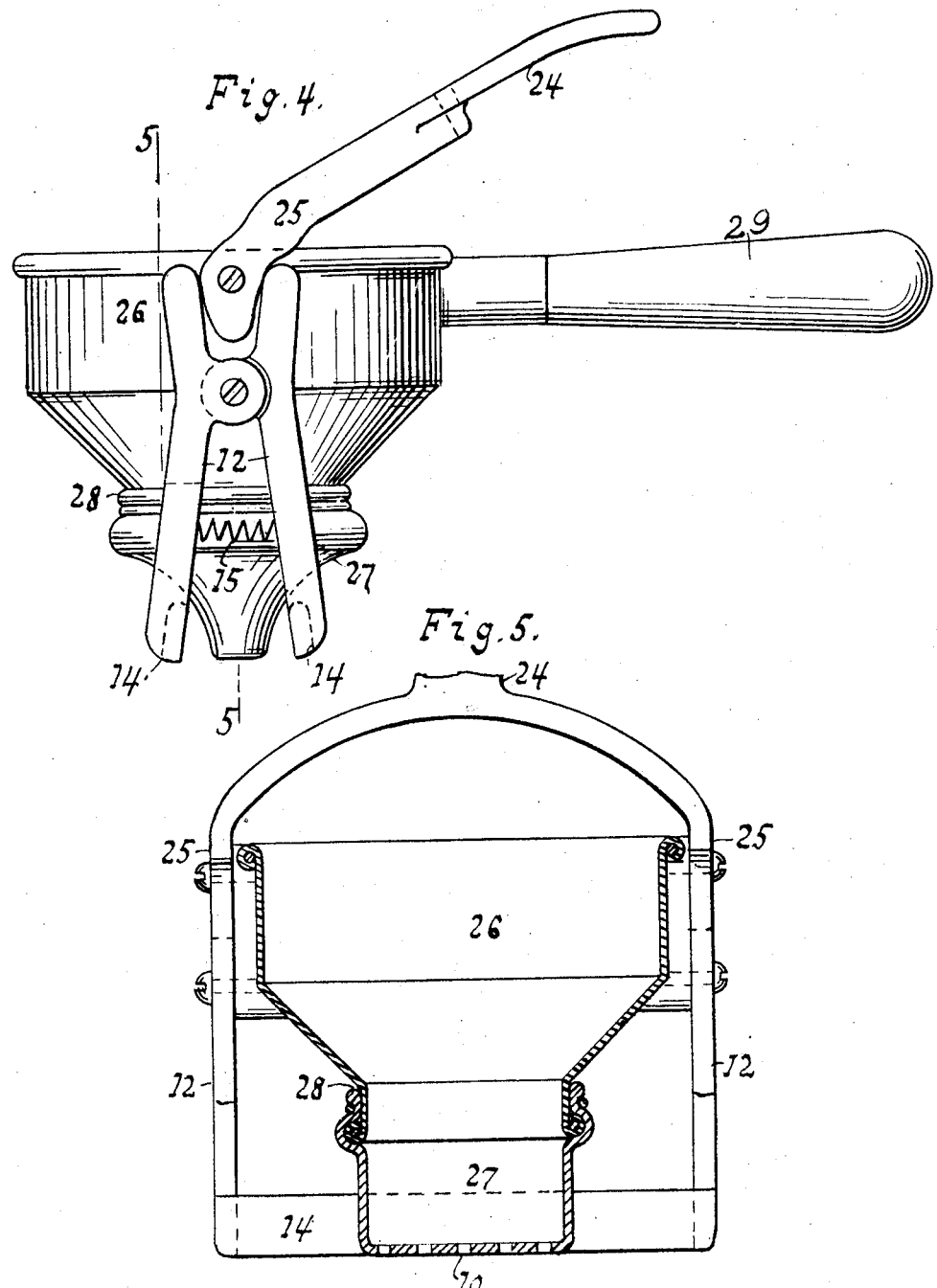

Patented Feb. 5, 1929.

1,701,293

UNITED STATES PATENT OFFICE.

LOUIS BLUMENTHAL, OF BROOKLYN, NEW YORK.

DOUGH-DRIPPING DEVICE.

Application filed February 23, 1926. Serial No. 89,925.

This invention relates essentially to a dough dripping device in which the gravitation of the dough from a hopper is governed by the compression of a yieldable outlet.

The invention is designed to provide the hopper with an elastic nipple and a pair of jaws coacting with the nipple to squeeze the dough from a series of openings formed in the bottom of the nipple.

The invention resides more particularly in the novel combinations hereinafter described and claimed, reference being made to the accompanying drawings in which:—

Fig. 4 is a side elevation of a modification.

Fig. 5 is a vertical section taken along the line 5 5 of Fig. 4.

Figure 1:
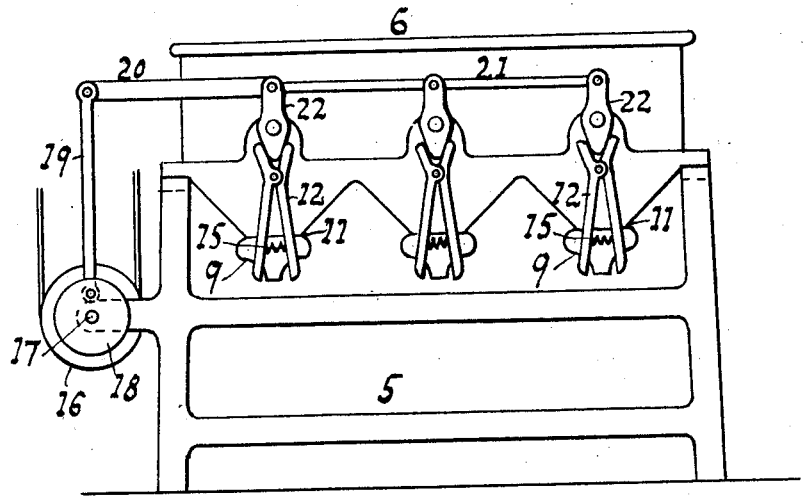
Fig. 1 represents a side elevation of a machine embodying this invention.
Figure 2:
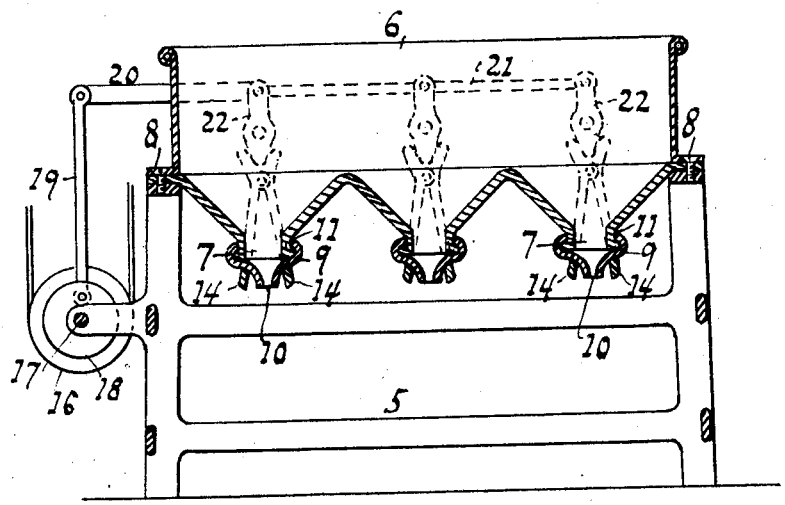
Fig. 2 is a vertical longitudinal central section of the same.

In the drawings the numeral 5 designates a frame having a rectangular hopper 6 the lower portion of which is conical and has an outlet 7 to permit the dough to pass through. There are a plurality of the outlets shown in Figs. 1 and 2 leading from the hopper. The hopper and conical portions are fastened by means of screws 8 to the upper part of the frame.

Figure 3:
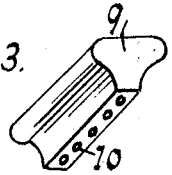
Fig. 3 is a perspective view of a nipple.

Each outlet from the lower portion of the hopper is equipped with a rubber nipple 9 substantially rectangular and it has a number of orifices 10 as indicated in Fig. 3 to allow the dough to flow out. A mouth 11 of the nipple snaps over a rim of the opening and is fastened so that it cannot be loosened.

In order to eject the dough from the orifices a plurality of pairs of rock levers 12 pivoted to each side of the hopper are provided. The leg of one lever is connected to the leg of the opposite lever by means of a transverse bar 14 which with the bar of the adjacent lever forms a pair of jaws to coact with the lower portion of the nipple. The jaws are normally held open by a spring 15 arranged between the legs.

The rock levers are actuated by a pulley and belt connection or motor 16 carried by a transverse shaft 17 mounted on a bracket of the frame. To the shaft is fixed two eccentrics 18 each with a rod 19 pivoted to a link 20 so as to transmit rectilinear reciprocating movement to a bar 21 connected to cam levers 22 engaging the handles or upper ends of the rock levers.

In Figs. 4 and 5 is shown a manually actuated device for household use operated by means of a handle 24 connecting a pair of levers 25 pivoted to each side of a cylindrical hopper or receptacle 26 for holding the dough. A nipple 27 has a cylindrical mouth 28 to fit over the tubular beaded neck of the outlet and the lower portion thereof is practically rectangular. The nipple is firmly secured to the neck by wiring or otherwise. In this device a handle 29 projects from the side of the hopper below the handle 24 for holding the utensil. By grasping the handle 29 the handle 24 can be actuated with one or more of the fingers so as to oscillate the cam in order to close the jaws. When the jaws close they shut the orifices of the nipple and the semi-liquid dough running from the orifices is shut off.

The device is utilized for dropping small quantities of prepared dough into hot fat and when brown the drips are suitable for soups or other comestibles. When the cam levers are operated the handle portions of the rock levers spread and the legs or jaws move toward each other compressing the lower part of the nipple and a drop of dough is thereby forced from each orifice formed in the bottom of the nipple.

I claim:—

1. A dough dripping device comprising a hopper having an outlet, an elastic nipple its upper portion having a mouth secured to the outlet, an elongated compartment depending from the mouth with a series of orifices in its bottom wall, a pair of rock levers pivoted to the side of the hopper with extensions above the pivot, the leg of each lever having a bar connected to the opposite lever which with the bar connecting the adjacent levers constitute a pair of jaws normally out of action with the lower part of the nipple, and a cam engaging the extensions adapted to spread the upper ends of the rock levers in order to close the jaws thereby squeezing out of the orifices the dough in the compartment.

2. A dough dripping device comprising a hopper provided with a handle and having an elongated outlet, an elastic nipple its upper portion having a mouth secured to the outlet, an elongated rectangular compartment depending from the mouth with a series of orifices in its bottom wall, a pair of rock levers pivoted to each side of the hopper with extensions above the pivot the leg of each lever having a transverse bar at its end connected to the opposite lever which with the bar connecting the adjacent levers constitute a pair of jaws normally out of action with the lower part of the nipple, and a cam engaging the extensions with a handle arranged above the hopper handle to manually operate the cam so as to spread the upper ends of the rock levers in order to close the jaws thereby squeezing out of the orifices the dough in the compartment.

In testimony whereof I have hereunto set my hand.

LOUIS BLUMENTHAL.